(No Model.)
Z. SQUIRES, Jr.
HARNESS SADDLE.
No. 306,656. Patented Oct. 14, 1884.
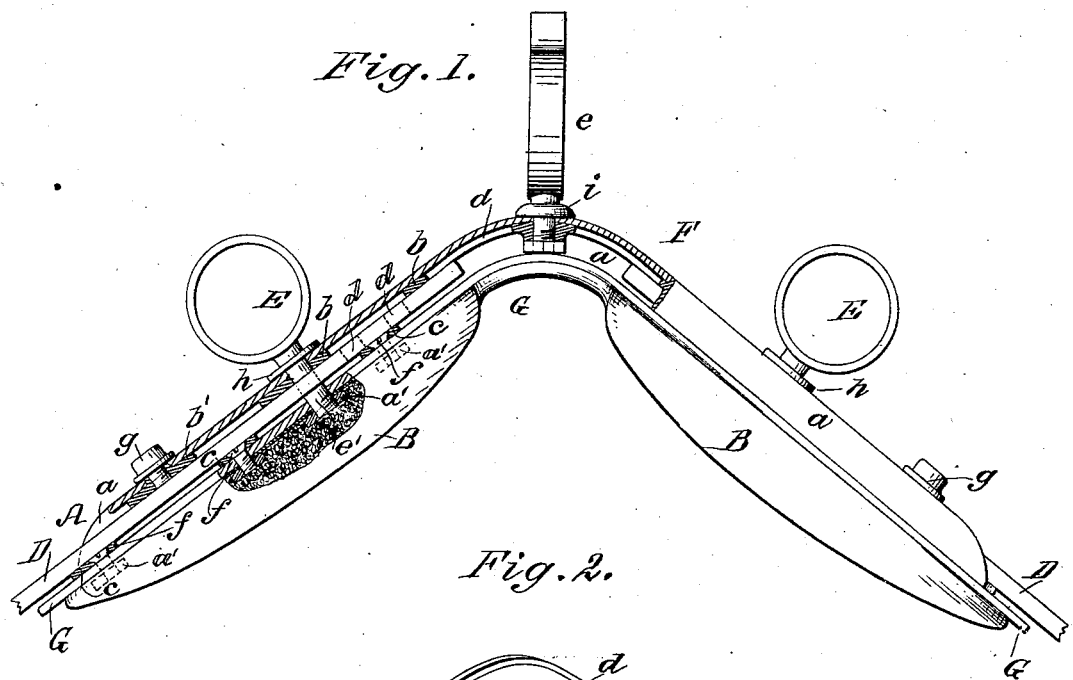
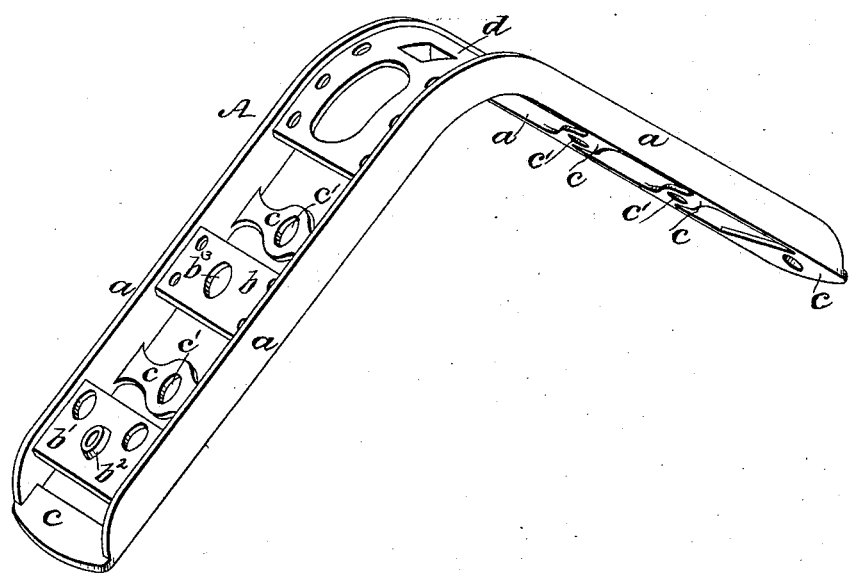
WITNESSES:
INVENTOR:

UNITED STATES PATENT OFFICE.

ZACHARIAH SQUIRES, JR., OF CHICAGO, ASSIGNOR TO HIMSELF AND EDWARD P. WATERS, OF ROSEVILLE, ILLINOIS.

HARNESS-SADDLE.

SPECIFICATION forming part of Letters Patent No. 306,656, dated October 14, 1884.

Application filed April 16, 1884. (No model.)

*To all whom it may concern:*

Be it known that I, ZACHARIAH SQUIRES, Jr., of Chicago, Cook county, Illinois, have invented a new and Improved Back-Pad for Harness, of which the following is a full, clear, and exact description.

This invention consists, principally, of a metallic harness-tree for back-pads, the tree having such construction that the skirts of the pad may be held by the terrets only and adjusted as to length below the pad by simply removing and replacing the terrets.

The invention also consists of the special construction of the tree, and of the construction, arrangement, and combination of parts, all as hereinafter described and claimed.

Reference is to be had to the accompanying drawings, forming part of this specification, in which similar letters of reference indicate corresponding parts in both figures.

Figure 1 is a sectional elevation of a harness tree and pad made in accordance with my invention, and Fig. 2 is a perspective view of my new and improved metallic harness-tree.

The tree A is by preference made in skeleton form and of malleable cast-iron. It is formed with the side flanges, $a$ $a$, upper and lower apertured cross-pieces, $b$ $b'$ $c$, and apertured crown plate or arch $d$, in which latter the check-hook $e$ is secured.

B B represent the pads, which are provided with the nuts $a'$ $a'$, and are held to the tree A, with the leather G between the pads and tree, by the screws $f$ and screw-shanks $e'$ of the terret E, which pass through the holes $b^3$, made in the upper cross-pieces, $b$, and enter the nuts $a'$ $a'$, as shown in Fig. 1.

D D are the leather skirts of the back-pad. These enter the tree A between the upper and lower cross-pieces, $b$ $b'$ $c$, and reach up beyond the terrets E E nearly up to check-hook $e$, and they are each formed with several holes, $d$, through which the screw-threaded shanks $e'$ of the terrets E E pass, as shown in Fig. 1.

Upon the outside of the tree A is placed the outer leather, F, which passes over the tree, and is supported upon the upper surfaces of the cross-pieces $b$, so that its upper surface stands flush with the upper edges of the flanges $a$ $a$, and this leather F is held in place by the short-headed screw-bolts $g$ $g$, which enter the collared screw-threaded openings $b^2$ of the cross-pieces $b'$, and by the flanges $h$ $h$ of terrets E, and also by the flange $i$ of the check-hook $e$. From this construction it will be seen that the outer leather, F, gives a rich and nice appearance to the pad, and that the skirts D D are held within the tree by the terrets E E only, so that by removing the terrets the skirts may be lengthened or shortened to suit the size of any horse, and that no stitching is required in connecting the parts of the pad.

Having thus described my invention, I claim as new and desire to secure by Letters Patent—

1. As an improved article of manufacture, the pad-tree A, formed with the flanges $a$ and upper and lower cross-pieces, $b$ $b'$ $c$, and the collared screw-threaded openings $b^2$, adapted to receive the short screw-bolts $g$ $g$, which pass only through the cross-pieces $b$, substantially as described.

2. The pad-tree A, formed with upper and lower cross-pieces, $b$ $b'$ $c$, in combination with the skirts D D, placed between the said cross-pieces, and held by the shanks of the terrets E E, substantially as and for the purposes described.

3. The pads B B, provided with the inclosed nuts $a'$ $a'$, in combination with the tree A, formed with lower cross-pieces, $c$, through which the screws $f$ pass and enter the nuts $a'$, substantially as described.

ZACHARIAH SQUIRES, JR.

Witnesses:
CHARLES SQUIRES,
L. J. TORRY.